United States Patent

Barnard et al.

[11] Patent Number: 5,928,978
[45] Date of Patent: Jul. 27, 1999

[54] CONTINUOUS METHOD OF PRODUCING SILICON CARBIDE FIBERS

[75] Inventors: Thomas Duncan Barnard; Kimmai Thi Nguyen; James Alan Rabe, all of Midland, Mich.

[73] Assignee: Dow Corning Corporation, Midland, Mich.

[21] Appl. No.: 08/890,878

[22] Filed: Jul. 10, 1997

[51] Int. Cl.$^6$ .................................................. C04B 35/571
[52] U.S. Cl. ............................ 501/88; 501/92; 501/95.1; 501/96.2; 501/96.5; 264/625; 264/627; 264/639; 264/682
[58] Field of Search ................................. 501/88, 92, 95.1, 501/96.2, 96.5; 264/625, 639, 682, 627

[56] References Cited

U.S. PATENT DOCUMENTS

| | | |
|---|---|---|
| 4,158,687 | 6/1979 | Yajima et al. . |
| 4,604,367 | 8/1986 | Takamizawa et al. . |
| 4,657,791 | 4/1987 | Ukkonen . |
| 5,071,600 | 12/1991 | Deleeuw et al. . |
| 5,139,871 | 8/1992 | Wallace et al. . |
| 5,162,269 | 11/1992 | Deleeuw et al. . |
| 5,167,881 | 12/1992 | Atwell et al. ........................ 501/95.1 |
| 5,194,409 | 3/1993 | Sugihara . |
| 5,227,249 | 7/1993 | Lukco et al. . |
| 5,252,361 | 10/1993 | Frechette et al. . |
| 5,268,336 | 12/1993 | Deleeuw et al. ........................ 501/88 |
| 5,279,780 | 1/1994 | Lipowitz et al. . |
| 5,366,943 | 11/1994 | Lipowitz et al. . |
| 5,707,568 | 1/1998 | Deleeuw et al. ........................ 501/88 |
| 5,792,416 | 8/1998 | Sacks et al. ........................ 264/625 |

FOREIGN PATENT DOCUMENTS

| | | |
|---|---|---|
| 53-81727 | 7/1978 | Japan . |
| 94/02430 | 2/1994 | WIPO . |

*Primary Examiner*—Karl Group
*Attorney, Agent, or Firm*—Sharon K. Severance; Roger E. Gobrogge

[57] ABSTRACT

This invention pertains to a method for production of polycrystalline ceramic fibers from silicon oxycarbide (SiCO) ceramic fibers wherein the method comprises heating an amorphous ceramic fiber containing silicon and carbon in an inert environment comprising a boron oxide and carbon monoxide at a temperature sufficient to convert the amorphous ceramic fiber to a polycrystalline ceramic fiber. By having carbon monoxide present during the heating of the ceramic fiber, it is possible to achieve higher production rates on a continuous process.

14 Claims, 1 Drawing Sheet

CONTINUOUS METHOD OF PRODUCING SILICON CARBIDE FIBERS

The U.S. Government has a paid-up license in this invention and the right in limited circumstances to require the patent owner to license others on reasonable terms as provided for by the terms of NAS3-26385 awarded by NASA.

BACKGROUND OF THE INVENTION

Advance ceramic fibers are needed for use as reinforcement for ceramic and metal matrix composites. The fiber reinforcement enhances toughness, strength, stiffness and creep resistance for both ceramic and metal matrix composites. Silicon carbide fiber has long been sought as the potential reinforcement because it is predicted to possess high elastic modulus, excellent thermal stability, attractive thermal expansion characteristics, and relatively low density. Often the desired temperature exceeds the fiber capability, i.e. the fiber strength degrades significantly in just a few hours. For example Nicalon™ (SiCO) and Tyranno™ (SiCOTi) silicon oxycarbide fibers degrade at temperatures above 1200° C.

Several methods have been developed to make silicon carbide (SiC) based continuous fibers. One approach consists of depositing SiC by CVD on a core of carbon monofilament. However, because of the large diameter of these fibers, they are poorly suited for ceramic matrix composite (CMC) reinforcement and are too stiff to be woven into fabric as required by CMC applications. Another approach involves the melt-spinning of organosilicon polymers to form precursor fibers. The precursor fibers are then pyrolytically transformed into ceramic fibers. The final products have not been pure SiC fiber. This process is used to produce the Nicalon™ and Tyranno™ fibers discussed above.

A third method, disclosed in U.S. Pat. No. 5,279,780 to Lipowitz et al. produces near-stoichiometric polycrystalline silicon carbide (SiC) fibers that can withstand temperatures to 1400° C. while still maintaining reasonable strength. The process comprises heating an amorphous or microcrystalline ceramic fiber containing silicon, carbon and oxygen in an environment comprising a volatile sintering aid. According to U.S. Pat. No. 5,279,780 the sintering aid may be used by merely introducing it into the environment for pyrolysis in its volatile state or it may be diluted in an inert carrier gas such as argon or helium. The process may be run batch or continuous. When this process is run continuous it is still limited to slow line rates due to the time that is needed for the boron to diffuse into the fibers.

It has now been found that when carbon monoxide is present in the reactor with the purge gas, high rates of production can be achieved while still obtaining fibers with dense microstructure and with good physical properties such as tensile strength and modulus.

It is therefore an object of this invention to provide a continuous method for the production of polycrystalline ceramic fibers from silicon oxycarbide (SiCO) ceramic fibers.

SUMMARY OF THE INVENTION

This invention pertains to a method for production of polycrystalline ceramic fibers from silicon oxycarbide (SiCO) ceramic fibers wherein the method comprises heating an amorphous ceramic fiber containing silicon and carbon in an environment comprising boron oxide and carbon monoxide at a temperature sufficient to convert the amorphous ceramic fiber to a polycrystalline ceramic fiber. By having carbon monoxide present during the heating of the ceramic fiber, it is possible to achieve higher production rates on a continuous process.

THE INVENTION

Figure 1:
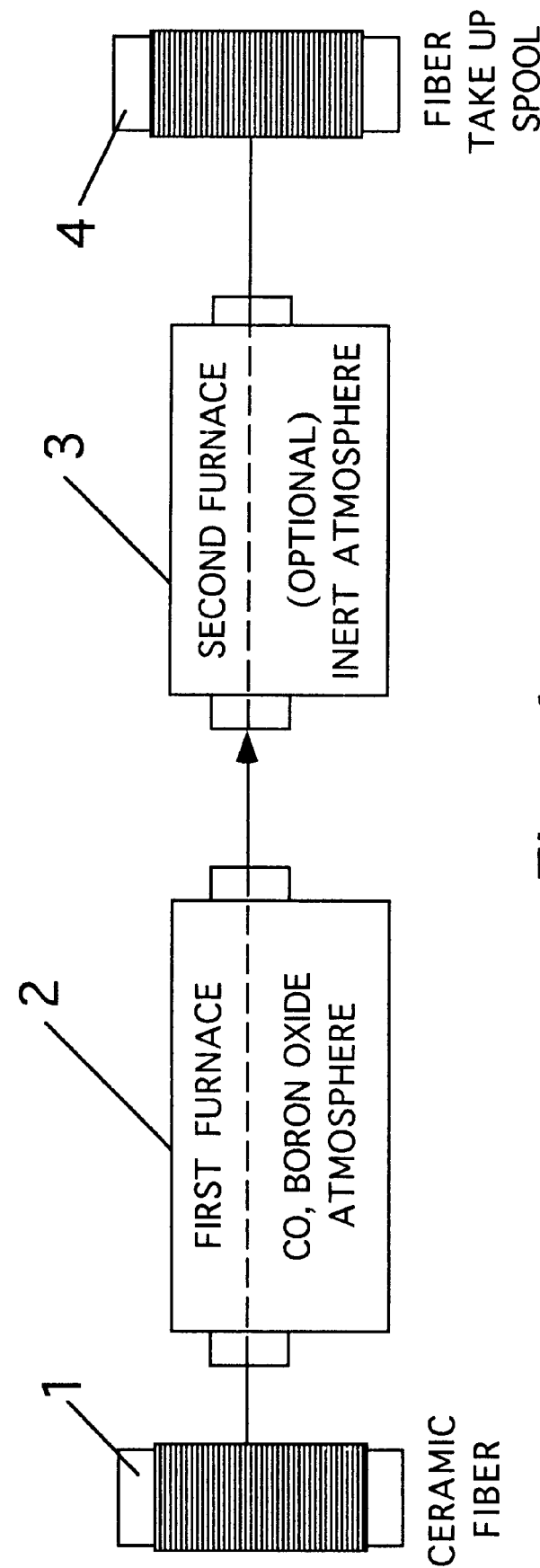
FIG. 1 represents a schematic diagram of the process of the instant invention.

This invention pertains to a method for the continuous production of polycrystalline silicon carbide (SiC) fibers wherein the method comprises heating an amorphous ceramic fiber comprising silicon and carbon in an inert environment comprising boron oxide and carbon monoxide (CO).

As can be seen in FIG. 1, the process comprises introducing an amorphous fiber(1) into a first furnace (2). The environment in the furnace is comprised of carbon monoxide, boron oxide and optionally an inert gas (e.g. argon). The fibers (1) are continuously fed through the furnace (2), with a residence time in the furnace (2) sufficient to diffuse about 0.1 wt % boron into the fiber (1). The presence of the carbon monoxide allows for shorter residence times in the furnace (2) and ultimately higher production speeds. The fibers (1) exit the furnace (2) and optionally enter into a second furnace (3) where they are densified. The fibers (1) exit the second furnace (3) and are collected for use by typically winding onto spools (4). The operating temperature in the first furnace (2) is typically in the range of 1500 to 1600° C. while the operating temperature in the second furnace (3) is typically in the range of 1900 to 2000° C. The conversion and densification steps may be combined and completed in the first furnace (2). This is typically done by heating the fiber (1) to higher temperatures during the treating process in the first furnace (2).

The ceramic fibers useful in this invention are not critical and nearly any amorphous ceramic fiber that contains silicon and carbon can be used. By "amorphous" it is meant to include fiber that is primarily amorphous (not crystalline) including those fibers which contain very small crystallites (nano/microcrystals) in an amorphous continuous phase.

The amorphous ceramic fibers contain silicon and carbon. It is preferred that the silicon and carbon be present in near stoichiometric or moderately carbon rich amounts. Other elements however, can also be present. These elements include, but are not limited to, oxygen, nitrogen, titanium, zirconium, chlorine, or any other element which can either be volatilized out of the fiber during pyrolysis or remain in the fiber without affecting the integrity of the resulting fiber.

Amorphous silicon carbide fibers useful in the instant invention are described in U.S. Pat. No. 5,279,780 to Lipowitz et al., herein incorporated by reference. These fibers may be exemplified by, but not limited to, SiC, SiCO, SiCN, SiCON, SiCOTi and other fibers. Preferred are SiCO and SiCOTi fibers. These fibers are commercially available as Nicalon™ fibers from Nippon Carbon (SiCO fibers with a diameter of 10–20 micrometers) and Tyranno™ fibers from UBE Industries (SiCOTi fibers with a diameter of 8–12 micrometers).

Commercially available fibers often contain a sizing to prevent their bonding together. Although not necessary, it is desirable to remove this sizing before the treatment. This can be accomplished by methods known in the art such as chemically dissolving the sizing or heating the fiber to a temperature sufficient to remove the sizing.

Methods for manufacturing the above amorphous ceramic fibers are well known in the art. The most common approach generally comprises spinning organosilicon polymers (with or without ceramic powder additives) followed by infusibilization and pyrolysis. Alternative approaches, however, such as various sol-gel processing techniques, chemical vapor deposition techniques, and the like are also contemplated herein. These methods are described in numerous texts, literature references and patents.

The amorphous ceramic fibers to be used in the process are continuous and may be of any length. However, since the method of this invention involves the continuous treatment of the ceramic fibers to convert them to a silicon carbide (SiC) fiber, it is preferable that the fiber be of sufficient length to receive the benefits of this invention.

The process of this invention comprises heating the amorphous ceramic fiber in an environment comprising a boron oxide, preferably $B_2O_3$, and carbon monoxide. The boron oxide is used by introducing it into the environment in its volatile state. This can be accomplished, for example, by placing boron oxide in the furnace and allowing it to vaporize when heated. Alternatively, the boron oxide can be volatilized outside the furnace and introduced into the furnace as a vapor. When the boron oxide is introduced as a vapor it could be used neat, it could be diluted in a carrier gas (e.g. inert gases such as argon, helium, etc.) or it could be added under a vacuum.

Generally, the time that the fiber is exposed to the boron oxide is not critical so long as exposure continues at least until the desired conversion and densification is complete or until sufficient boron oxide has been incorporated into the fiber to produce densification during subsequent thermal treatment in the absence of additional boron oxide.

The amount of boron oxide present in the environment generally is not critical so long as sufficient boron oxide is present to convert the fiber. Generally, the resultant polycrystalline fibers have about 0.1 wt % to 3.5 wt % boron incorporated therein after conversion and densification.

The environment in which the fibers are heated also comprises carbon monoxide. The carbon monoxide may be introduced with an inert carrier gas (e.g. argon) or it may be introduced neat. The amount of carbon monoxide present in the furnace is not critical. Typically the carbon monoxide is present in the furnace in an amount of 20 to 100 mole %, preferably 20 to 70 mole %. At lower concentrations of carbon monoxide lower production speeds result. At higher concentrations of carbon monoxide, higher production speeds can be achieved however, a carbon coating may form on the fiber.

The ceramic fibers are heated at a temperature sufficient to convert the ceramic fiber to polycrystalline fiber. By "polycrystalline" it is meant a fiber having at least 75% crystallinity with a small average crystallite size (e.g. less than about 1 micron). This temperature is generally 1400° C. or greater, preferably in the range of about 1500° C. to 2200° C., and most preferably in the range of about 1500° C. to 1600° C. If the fibers are to be converted and densified simultaneously then higher temperatures should be used, preferably in the range of 1900° C. to 2000° C.

The residence time of the fibers in the furnace (time that the fibers are heated) is not critical so long as they allow for diffusion of the boron oxide into the fiber and substantially complete removal of the volatile elements, such as oxygen, from the fibers. The time will be dependent on the length of the furnace, concentration of boron oxide, concentration of carbon monoxide and temperature. One skilled in the art will be able to determine the optimum time without undue experimentation.

Following heating in the environment comprising the boron oxide and carbon monoxide, the fiber may undergo a second heating step to densify. The densification is typically carried out in an environment that does not contain any boron oxide and carbon monoxide (e.g. pure argon). Densification is typically carried out in a separate furnace by heating the fiber with the boron incorporated therein to a temperature of between 1800° C. and 2200° C., preferably from 1900° C. to 2000° C. However, densification can be carried out in the same furnace as used to incorporate the boron into the fiber.

Any furnace suitable for the continuous production of fibers may be used herein. However, due to the corrosive nature of the boron oxide, it is preferred to use a furnace with a carbon lining.

It should be noted that the above process describes the conversion of preformed ceramic fibers (i.e. from a commercial source) to polycrystalline silicon carbide fibers. However, it is contemplated herein that the process of this invention could be incorporated into a standard fiber manufacturing process wherein, for example, fibers are spun, cured, and pyrolyzed in the presence of the boron oxide and carbon monoxide.

So that those skilled in the art can understand and appreciate the invention taught herein, the following examples are presented, it being understood that these examples should not be used to limit the scope of this invention found in the claims.

Apparatus and Experimental Procedure:

The experimental apparatus consisted of two furnaces, fiber feed spool and a take up winder.

The first furnace was a Lindberg Model 54474 fitted with a 3 inch ID and 60 inch long alumina tube. The alumina tube was lined with a 46.5 inch long and 1.75 inch diameter Grafoil™ carbon tube with BN spacers situated at both ends of the carbon tube to prevent the carbon tube from touching the hot alumina furnace tube.

The second furnace was a carbon lined Astro furnace.

To start an experiment, fiber was first strung through the first furnace and the protective tubes at both the inlet and outlet of the furnace. A boat made out of boron nitride containing about 10 g of boron oxide powder was situated at about 12" from the entrance of the furnace tube. Purge gases (argon or argon/CO) at the inlet and outlet of about 1.5 ft/sec velocity were turned on to blanket the furnace from air exposure. The winder was then set at a desired throughput rate. To minimize fiber line breakage during start-up, the following procedure was followed for the furnace heat-up period. The three zones were first ramped up at 7°/min to 1300° C. The middle and the exit zones were then ramped up at the same rate to the treatment temperature (i.e. 1500° C. or higher) while maintaining the entrance zone at 1300° C. until the middle and exit zones reached the desired temperature. The entrance zone was then ramped up to the desired temperature. The fiber was then continuously fed through the furnace. Following treatment with the boron oxide in the first furnace the fibers were continuously densified at a temperature of 1920° C. by feeding the fibers through the second furnace in an environment of argon.

Analytical Methods

Tensile Strength and Modulus were determined by pulling the fibers at a constant rate of extension to the breaking point pursuant to ASTM D 3379.

EXAMPLE 1

Tyranno® Lox M fibers were continuously treated according to the procedure outlined above using a mixture of argon and CO as the purge gas. The amount of CO used in the run is shown in Table 1. The results of the runs and furnace temperature are also reported in Table 1.

Comparison Example 1

Tyranno® Lox M fibers were continuously treated according to the procedure outlined above using argon as the purge gas (no CO). Useful fibers were obtained at a line speed of 1.4 inches/min (3.6 cm/min). When the speed was increased to 2.6 inches/min (6.6 cm/min) the tensile strength and the modulus were reduced. When the furnace temperature was increased to 1600° C. and the line speed was increased to 4.8 inches/min (12.2 cm/min) the fiber was very weak and could not be tested for physical properties. Results are in Table 1 (Samples C1–C3).

EXAMPLE 2

Nicalon® fibers were continuously treated according to the procedures outlined above. The fibers were treated at a rate of 0.67 ft/min (20.4 cm/min) at a furnace temperature of 1580° C. using 100% CO as the purge gas. The resulting SiC fibers had a strength of 2498 MPa and a modulus of 359 GPa. In the absence of any CO, the fibers were very weak, brownish rather than the typical black color and could not be tested for physical properties.

TABLE 1

Continuous treatment of Tyranno ® fibers.

| Sample | Speed (cm/min) | Strength (MPa) | Modulus (GPa) | Furnace Temp (° C.) | CO (mol %) |
|---|---|---|---|---|---|
| 1 | 20.4 | 3802 | 420 | 1550 | 45 |
| 2 | 20.4 | 3202 | 365 | 1550 | 40 |
| 3 | 20.4 | 2477 | 324 | 1550 | 8 |
| 4 | 61.0 | 2891 | 261 | 1525 | 25 |
| 5 | 61.0 | 2919 | 365 | 1600 | 70 to 100 |
| C1 | 3.6 | 2877 | 366 | 1500 | 0 |
| C2 | 6.6 | 1380 | 214 | 1500 | 0 |
| C3 | 12.2 | nd | nd | 1600 | 0 | nd = not determined

What is claimed is:

1. A method for the production of polycrystalline ceramic fibers wherein the method comprises:
   heating an amorphous ceramic fiber comprised of silicon and carbon in an environment to which a boron oxide and carbon monoxide have been added at a temperature sufficient to convert the ceramic fiber to a polycrystalline ceramic fiber, said carbon monoxide being added by purging said environment with a purge gas comprising carbon monoxide.

2. The method as claimed in claim 1 wherein the amorphous ceramic fiber additionally comprises an element selected from the group consisting of oxygen, nitrogen, titanium, zirconium, chlorine and boron.

3. The method as claimed in claim 1 wherein the amorphous ceramic fiber comprises a material selected from the group consisting of SiC, SiCO, SiCN, SiCON, and SiCOTi.

4. The method as claimed in claim 3 wherein the amorphous ceramic fiber comprises SiCOTi.

5. The method as claimed in claim 2 wherein the amorphous ceramic fiber comprises silicon, carbon and oxygen.

6. The method as claimed in claim 1 wherein the boron oxide is $B_2O_3$.

7. A The method as claimed in claim 1 wherein the carbon monoxide is present in an amount of 20 to 70 mole % of the purge gas.

8. The method as claimed in claim 1 wherein the amorphous ceramic fiber is heated to a temperature of 1400° C. to 2200° C.

9. The method as claimed in claim 8 wherein the amorphous ceramic fiber is heated to a temperature of 1500° C. to 2000° C.

10. A method for the production of polycrystalline ceramic fibers wherein the method comprises
   heating an amorphous ceramic fiber comprised of silicon and carbon in an environment to which a boron oxide and carbon monoxide have been added at a temperature of 1400° C. to 2200° C. for a time sufficient to incorporate boron oxide into the ceramic fiber and substantially remove any volatile elements from the fiber, said carbon monoxide being added by purging said environment with a purge gas comprising carbon monoxide; and
   thereafter heating the ceramic fiber with the boron oxide incorporated therein at a temperature of 1800° C. to 2200° C. in an inert environment to convert the ceramic fiber to a polycrystalline ceramic fiber.

11. The method as claimed in claim 10 wherein the amorphous ceramic fiber is heated to a temperature of 1500° C. to 1600° C. and the ceramic fiber with the boron oxide incorporated therein is heated at a temperature of 1900° C. to 2000° C.

12. A process for preparing a polycrystalline ceramic fiber comprising spinning a preceramic polymer comprising silicon and carbon to form a green fiber, curing the green fiber, and pyrolyzing the green fiber in a manner which incorporates boron into the fiber by diffusion wherein the improvement comprises
   purging said pyrolysis environment with a purge gas comprising carbon monoxide in an amount sufficient to reduce the time necessary for the boron to diffuse into the fiber.

13. A method for the production of polycrystalline ceramic fibers wherein the method comprises:
   heating an amorphous ceramic fiber comprised of silicon and carbon in an environment to which a boron oxide and carbon monoxide have been added at a temperature sufficient to convert the ceramic fiber to a polycrystalline ceramic fiber, said carbon monoxide being added by purging said environment with a purge gas comprising carbon monoxide.

14. The method as claimed in claim 13 wherein the carbon monoxide is present in the purge gas in an amount of 20 to 100 mole % of the purge gas.

* * * * *